Figure 1:
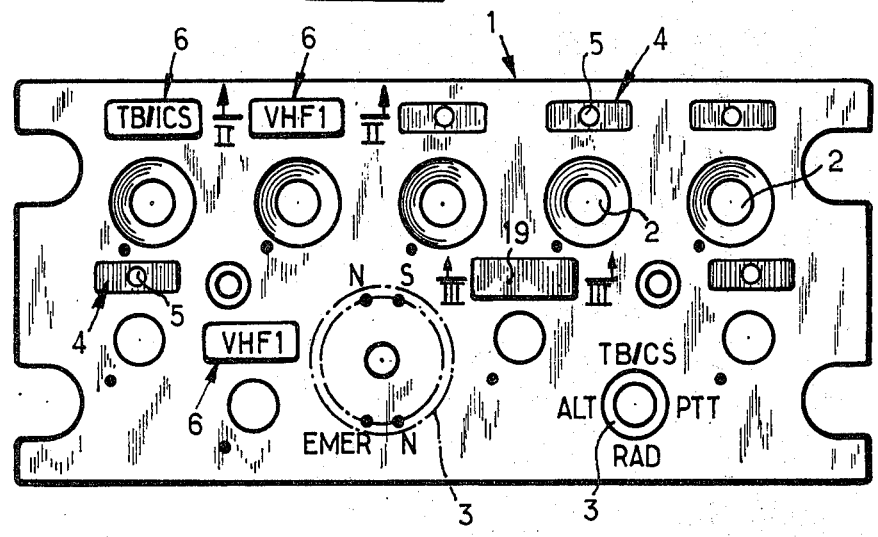

United States Patent [19]

Bouvrande

[11] 4,321,655
[45] Mar. 23, 1982

[54] DASH-BOARD WITH REMOVABLE INSCRIPTIONS

[75] Inventor: Andre M. Bouvrande, Brunoy, France

[73] Assignee: Societe de Telecommunications Electronique Aeronetique et Maritime "TEAM", France

[21] Appl. No.: 131,441

[22] Filed: Mar. 18, 1980

[30] Foreign Application Priority Data

Mar. 19, 1979 [FR] France ............................. 79 06876

[51] Int. Cl.³ ........................................... G01D 11/28
[52] U.S. Cl. ...................................... 362/29; 362/23; 362/31
[58] Field of Search ...................... 362/23, 26, 27, 28, 362/29, 30, 31

[56] References Cited

U.S. PATENT DOCUMENTS 3,281,861 10/1966 Simopoulos ........................... 362/29
4,177,501 12/1979 Karlin .................................. 362/31

Primary Examiner—Donald P. Walsh
Attorney, Agent, or Firm—Steinberg & Raskin

[57] ABSTRACT

A dash-board with easily interchangeable inscriptions comprising a front plate made from translucent material, opacified on one of its sides and comprising at least one recess opening on said opacified side and an inscription-bearing cap-like insert secured within said recess and including a translucent element underlying said inscriptions and extending into said recess.

10 Claims, 3 Drawing Figures

DASH-BOARD WITH REMOVABLE INSCRIPTIONS

The invention relates to a kind of dash-board or like instrument-panel comprising removable and interchangeable inscription-carrying support members or like holder means. Various types of dash-boards or like instrument-panels are known for various apparatus or measuring instruments and adapted to bear indications for instance in front of or opposite to monitor or indicator lamps, pilot or like control lights which exhibit a front face directed towards the observer and consisting of a plate made from transparent and insulating material such for instance as a synthetic material of the plexiglas kind.

This front plate is opacified on its surface for instance by being covered or coated with a black paint. Then the inscriptions or markings which are desired to be provided on the plate are engraved or carved so that only the carved or engraved characters alone remain translucent.

A light source such as an electric miniature bulb is mounted within a cavity located for instance within the thickness of the plate. The light emitted by the source would diffuse or spread through the thickness of the plate and at the surface of the plate the light would only pass through the carved or engraved spaces so that the inscriptions would then appear in a luminous condition on an opaque background on the front face or side.

This known arrangement suffers from the following inconvenience.

It may indeed happen that the inscriptions or markings present on the plate have to be changed without it being necessary to change the shape and size thereof. It is then mandatory to replace the whole plate by another one with new inscriptions. This is time-consuming and expensive.

The invention provides a new dash-board or like instrument-panel overcoming said drawback.

The device proposed by the invention consists in a dash-board or like instrument-panel of the type comprising a plate made from a translucent material and opacified on one of its faces or sides and of inner lighting or illuminating means, and characterized in that the plate comprises at least one recess opening into said opacified face and of which at least one wall portion is translucent, in that an inscription-bearing cap-like insert member is secured within said recess and in that the cap-like insert member comprises a translucent element underneath said inscriptions and extending into said recess.

The dash-board according to the invention thus offers the advantage of always retaining the same front plate even though it is desired to change the inscriptions since these are engraved or carved into a cap-like insert member which may be separated or removed from the plate.

Figure 2:
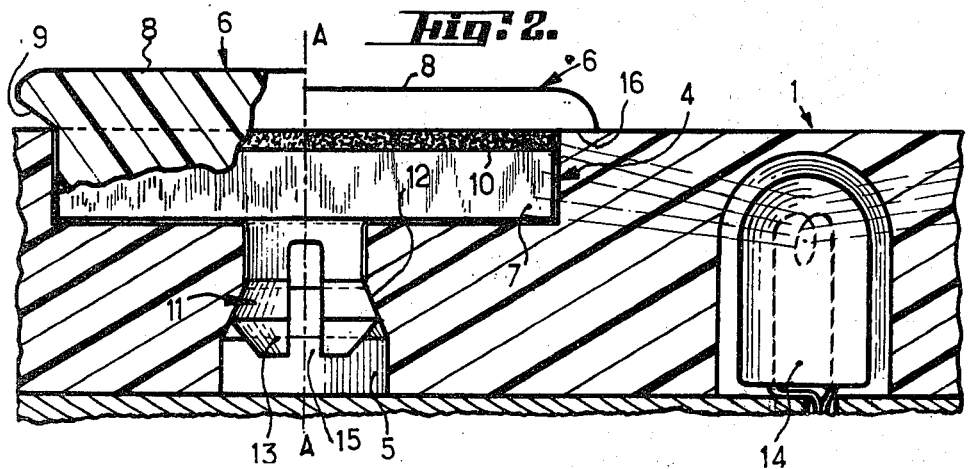
Figure 3:
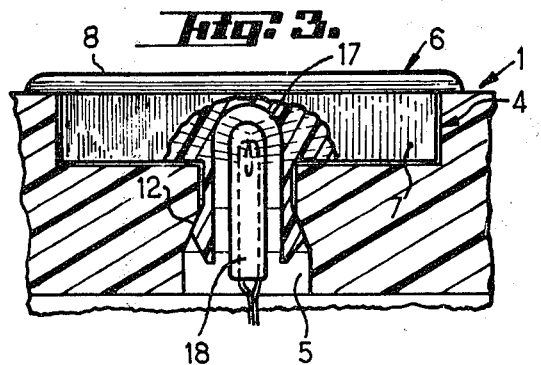

The invention will be better understood and other characterizing features, details and advantages thereof will appear more clearly as the following explanatory description proceeds with reference to the accompanying diagrammatic drawings given by way of non limiting example only illustrating a presently preferred specific embodiment of the invention and wherein:

FIG. 1 is a top view of the front plate of a dash-board according to the invention;

FIG. 2 is a view of the front plate in partial section taken upon the line II—II of FIG. 1, that part of the cap-like insert member, lying on the right-hand side of the axis A—A, showing an outside view of the cap-like insert member whereas that part on the left-hand side of the axis A—A shows a second embodiment of the cap-like insert member in partial section; and FIG. 3 shows a partial section through the front plate taken upon the line III—III of FIG. 1 and illustrating a third embodiment of the cap-like insert member which is shown as an outside view with parts broken away.

Referring now to FIG. 1, there is seen a front plate 1 of the dash-board or instrument-panel surrounding pilot lights 2 or instrument dials 3. This plate is formed with recesses 4 in the bottoms of which are opening cavities 5 the function of which will be described hereinafter.

The recesses are adapted to accommodate the cap-like insert members 6. Three of these cap-like insert members may be seen in FIG. 1 positioned within the recesses 4.

FIG. 2 shows the structure of a cap-like insert member according to two embodiments of the invention, respectively. The cap-like insert member 6 consists essentially of a depending translucent element or body 7 filling up the whole space of the recess 4 and the faces of which are in front of the walls of the recess, respectively, thereby enabling the light to pass from the plate towards the inside of the cap-like insert member. For this purpose a lamp 14 is fitted in a housing provided within the thickness of the plate.

The body of the cap-like insert member is advantageously topped with a head portion 8 assuming the shape for instance of a small rectangular plate and which extends in projecting relationship beyond the front plate of the dash-board and overlaps same along the periphery 16 of the recess 4 when the cap-like insert member is fitted into the recess so that no interstice or like clearance is left between the outside face of the front plate and the head portion. Owing to this arrangement of the head portion of the front plate any stray light diffusion between the cap-like insert member and the plate is avoided. Moreover, this arrangement prevents any possibility of removal of the cap-like insert member from the front side which may be desired in some instances. The removal of the cap-like insert member is then possible only by ejecting the cap-like insert member through the rear side, the front plate having been removed previously. In such a case there is of course provided an access cavity allowing the back portion or bottom of the cap-like insert member to be reached through the thickness of the plate.

If on the contrary it is desired to provide for the possibility of an easy removal of the cap-like insert member by pulling same forewards without the requirement of removing the plate, in order to have a better grip on the head portion, there may be advantageously provided on a part of the head flange a notch, a cut, an inverted chamfer or bevelled edge or the like 9, for instance on one portion of both opposite sides. The top of the head portion of the cap-like insert member is adapted to receive the desired inscription. The head portion may be opacified on its surface through any suitable treatment or process. For instance it may be coated with an underlying layer or primer of translucent white paint covered with an opaque outer layer of paint. Then the inscription is engraved or carved so as to extend through the black paint coating only.

The walls of the translucent element or body portion 7 of the cap-like insert member may also comprise an opaque lining at least on their upper portion. Such a lining may of course be deposited on one portion of the vertical walls of the recess 4. This lining may preferably consist of a thin strip of opaque paint 10 located on the periphery of the translucent body portion 7 and in its upper portion or directly adjacent to the head portion. This strip performs the function of an optical sealing joint, i.e. preventing any stray light diffusion between the wall of the recess 4 and the face in front of the element 7 adjacent to the opacified surface of the plate.

FIG. 2 also illustrates an embodiment wherein are provided locking means co-operating between the cap-like insert member and the plate.

These locking means consist on the one hand of a resiliently deformable locking shank portion 11 integral with the cap-like insert member and on the other hand of a cavity 5 adapted to receive the locking shank portion which may be formed with a bulged or enlarged part 13 and the cavity may comprise a co-operating tapering, reduced or narrowed portion 12. More specifically the locking shank portion may consist of a cylindrical upper part directly adjacent to the body portion of the cap-like insert member and of a lower part consisting of two frustums of a cone or truncated cones joined together with their great bases and one of the small bases of which is adjacent to said upper part. In that instance the cavity will advantageously be formed with a tapered or narrowing portion of frusto-conical shape. At last with a view to facilitating the positioning of the cap-like insert member, the locking shank portion may be provided with an axial slot 15 which would facilitate its deformation.

FIG. 3 illustrates another embodiment of the invention corresponding to a different use of the cap-like insert member.

In the embodiments snown more particularly in FIG. 2, it is indeed seen that a single lamp 14 located within the thickness of the plate is effective to send the light towards several cap-like insert members at the same time so that when one single lamp is lit or put on the inscriptions of various cap-like insert members would all become apparent at the same time.

It may however be desirable to provide a cap-like insert member which would cause its inscriptions to appear in some instances only and independently of the illumination or lighting of the other cap-like insert members. Such a possibility is interesting in the case of alarms or warnings, that is in the case where it is desirable to indicate on the dash-board the occurrence of an anomaly or of a failure in the system.

The cap-like insert member shown in FIG. 3 is designed so as to provide for such a possibility.

It exhibits an opacified head portion onto which the inscriptions have been put by means of a silk-screen printing process and covered with black so that they appear only when the light is diffused inside of the cap-like insert member. Such a cap-like insert member is shown at 19 in a non illuminated condition on FIG. 1. Furthermore an opaque deposit is interposed between the cap-like insert member and the plate. This may for instance be a coating of black paint covering one portion of the walls of the cap-like insert member or of the recess and preferably all of their walls.

On the other hand a housing 17 is provided in the cap-like insert member to receive the lamp 18 corresponding to the cap-like insert member and positioned within the recess 4 and the cavity 5. This lamp is distinct from the normal lighting circuit.

As illustrated in FIG. 3 there may be advantageously provided a central locking shank portion of the same type as that previously described and encompassing the lamp when the cap-like insert member is secured into the recess 4. Instead of a single central locking shank portion it is of course possible to provide two similar locking shank portions located on either side of the lamp housing.

Many modifications or alternative embodiments of the invention may of course be contemplated. In particular it is possible to design cap-like insert members without any sidewards projecting head portion as well as cap-like insert members fitted with different locking systems (adhesive bonding or sticking means for instance).

The invention also comprises all the technical equivalents of the means described as well as their combinations if same are carried out according to its gist and used to within the scope of the appended claims.

I claim:

1. A dashboard of the kind comprising a plate made from a material, opacified on one of its faces and inner lighting means, said plate having at least one recess opening into said opacified face, an inscription-bearing cap-like insert member secured within said recess and comprising a translucent element underlying said inscriptions, said element extending into said recess, wherein the improvement comprises that said cap-like insert member is removably secured within said recess, at least one portion of which is translucent, by locking means provided on said cap-like insert including at least one resiliently deformable locking shank portion integral with said cap-like insert member, and corresponding locking means provided in said plate including at least one cavity for receiving said locking shank portion, said cavity opening into the bottom of said recess.

2. A dash-board according to claim 1, wherein said lighting means are fitted within the thickness of said plate and said cap-like insert member is arranged so that at least one portion of said element is in front of said translucent wall portion of said recess when said cap-like insert member is secured within said recess.

3. A dash-board according to claim 1, wherein said lighting means consisting in particular of a lamp such as a warning lamp are located within said recess and an opaque deposit is interposed between said cap-like insert member and said plate, said cap-like insert member comprising a housing accommodating said lighting means when said cap-like insert member is secured within said recess.

4. A dash-board according to claim 3, wherein said opaque deposit is applied as an opaque coating layer onto at least one portion of the side walls of said recess.

5. A dash-board according to claim 1, wherein said locking shank portion is formed with an axial slot for facilitating its deformation when it is inserted into said cavity.

6. A dash-board according to claim 1, wherein said cap-like insert member comprises at its upper part an opaque head portion projecting on its opacified face from and beyond said plate and adapted to carry said inscriptions.

7. A dash-board according to claim 6, wherein the flange-like projecting edge of said head portion of said cap-like insert member is formed with a notch, a cut or an inverted chamfer whereby said cap-like insert member may be removed from the front side.

8. A dash-board according to claim 1, wherein said lighting means are positioned in said cavity and said locking shank portion is located in registering extension of said housing so that said locking shank portion surrounds said lighting means when said cap-like insert member is fitted into said recess.

9. A dash-board according to claim 1, wherein the walls of said translucent element of said cap-like insert member comprise at least on their upper part an opaque lining provided in particular as a strip.

10. A dashboard of the kind comprising a plate made from a material, opacified on one of its faces and inner lighting means, said plate having at least one recess opening into said opacified face, an inscription-bearing cap-like insert member secured within said recess and comprising a translucent element underlying said inscriptions, said element extending into said recess, wherein the improvement comprises that said cap-like insert member is removably secured within said recess, at least one portion of which is translucent, by locking means provided on said cap-like insert including at least one resiliently deformable locking shank portion integral with said cap-like insert member, and corresponding locking means provided in said plate including at least one cavity for receiving said locking shank portion, said cavity opening into the bottom of said recess, said locking shank portion comprising an enlarged part and said cavity being formed with a narrowed part.

* * * * *

UNITED STATES PATENT AND TRADEMARK OFFICE
CERTIFICATE OF CORRECTION

PATENT NO. : 4,321,655

DATED : March 23, 1982

INVENTOR(S) : Andre M. Bouvrande

It is certified that error appears in the above—identified patent and that said Letters Patent is hereby corrected as shown below:    Title page:

(73) Assigne: Societe de Telecommunications Electronique Aeronautique et Maritime "TEAM" France.

Signed and Sealed this

Sixth Day of September, 1988

Attest:

DONALD J. QUIGG

Attesting Officer

Commissioner of Patents and Trademarks